United States Patent [19]
Russell et al.

[11] Patent Number: 6,028,862
[45] Date of Patent: Feb. 22, 2000

[54] FAST PATH NETWORKING

[75] Inventors: Steven P. Russell, Menlo Park; John H. Hart, Saratoga; Jeffrey J. Krause, Los Altos, all of Calif.

[73] Assignee: 3Com Corporation, Santa Clara, Calif.

[21] Appl. No.: 08/853,326

[22] Filed: May 8, 1997

[51] Int. Cl.[7] .............................. H04L 12/28; H04L 12/56
[52] U.S. Cl. ............................................. 370/397; 370/401
[58] Field of Search .................................... 370/352, 354, 370/355, 397, 399, 400, 410, 401, 389

[56] References Cited

U.S. PATENT DOCUMENTS

| | | | |
|---|---|---|---|
| 5,103,444 | 4/1992 | Leung et al. | 370/432 |
| 5,500,860 | 3/1996 | Perlman et al. | 370/401 |
| 5,633,869 | 5/1997 | Burnett et al. | 370/410 |
| 5,732,078 | 3/1998 | Arango | 370/355 |

*Primary Examiner*—Michael Horabik
*Assistant Examiner*—Kevin C Harper
*Attorney, Agent, or Firm*—Wilson Sonsini Goodrich & Rosati

[57] ABSTRACT

The present invention provides a method and an apparatus for facilitating high bandwidth transmissions of data through a computer network. The invention uses communications through a routed network, such as the Internet, to establish a communication pathway through a connection-oriented network, such as an ATM or a frame relay network. This technique effectively exploits the universal addressing structure of routed networks, such as the Internet, to establish high bandwidth connections through connect-oriented networks. The present invention also facilitates selection of a connection-oriented network for data transmissions from a plurality of connection-oriented networks based upon parameters such as availability and costs. One embodiment of the present invention facilitates connections through mixed connection-oriented and routed networks, as well as through multicast networks. Another embodiment multiplexes several flows of data into a single connection through a connection-oriented network.

70 Claims, 4 Drawing Sheets

FAST PATH NETWORKING

BACKGROUND

1. Field of the Invention

The present invention relates to systems for transferring data between computer systems, and more particularly to systems which use communications across a routed network to establish communication pathways across a connection-oriented network.

2. Related Art

Advances in computer networking technology have led to the development of applications such as video conferencing, which require sustained high bandwidth transmissions across computer networks. Providing such high bandwidth transmissions has proven challenging on routed networks such as the Internet. Routed networks operate by forwarding packets between a source and a destination through an intervening series of routers which examine the address of a packet, and use the address to forward the packet to other routers, and ultimately to the destination. Routed networks, such as the Internet, provide highly-developed addressing structures, in which millions of networked computing systems have unique addresses, and through which systems can easily communicate with each other. However, the overhead involved in routing the data from source to destination, including routing and queuing delays, makes it challenging to transmit high bandwidth traffic through a routed network with bounded latency and jitter.

In the past, routed networks carried predominately bursty traffic which was not sensitive to variations in delay. Such traffic includes e-mail and the file transfers that underlie the World Wide Web. This traffic is ideally suited to the connectionless environment provided by routers. As routed networks become more prevalent and familiar, there is an increasing demand to carry video, voice, music, and other real-time traffic. Some of this traffic is very high-speed; other of this traffic is not high speed but cannot easily tolerate variations in delay. Much of this traffic is less bursty and hence is less naturally suited to a connectionless transmission mechanism. The need to support a mix of traffic of widely varying speeds, delay tolerances, and connection longevities over a single integrated network is a difficult engineering problem.

In contrast, connection-oriented networks, such as asynchronous transfer mode (ATM) or frame relay networks, operate by establishing a connection between a source and a destination. Once the connection is established, data can be rapidly sent from source to destination using a virtual physical layer (layer one) circuit without the computing overhead and queuing delays associated with a routed network. However, connection-oriented networks do not presently have highly-developed and universal addressing structures, such as exist in routed networks such as the Internet. Although connections may be established through a connection-oriented network between a given source and a given destination, there is presently no mechanism to use non-routed connections to send IP traffic in a general or standard way. Consequently, connections cannot easily be established through connection-oriented networks between a given source and a given destination.

In order to facilitate sustained high bandwidth transmissions across routed networks, the resource reservation protocol (RSVP) has been developed. RSVP operates by reserving bandwidth along a routed network so that a high bandwidth transmission can be channeled through the routed network. As is mentioned in the Abstract of Version 1 of the RSVP protocol specification, RSVP is a resource reservation setup protocol designed for an integrated services Internet. RSVP provides receiver-initiated setup of resource reservations for multicast or unicast data flows, with good scaling and robustness properties. Thus RSVP breaks into two parts: The receiver-initiated part, and the resource reservation part. The resource-reservation part, which builds circuit-like services (supporting data flows) on a connectionless store-and-forward base, is very compute intensive for that store-and-forward base.

Another method of facilitating high bandwidth transmission is the Ipsilon Flow Management Protocol (IFMP). IFMP is a protocol which instructs an adjacent node to attach a layer two label to a specified IP flow. "The label allows more efficient access to cached routing information for that flow and it allows the flow to be switched rather than routed in certain cases. . . . If a network node's upstream and downstream links both redirect a flow at the node, then the node can switch the flow at the data link layer rather than forwarding it at the network layer." See Ipsilon Flow Management Protocol specification for IPv4 version 1.0. Hence, IFMP aims at employing the data link layer directly to carry a flow (rather than reserving router resources for the flow). However, in IFMP a centralized monitoring node or router is required to discover the flow and find a better path. The centralized node must guess the service required by the traffic and must guess the time at which the traffic is ended so that the link layer path may be reclaimed. The approach used in RSVP is superior.

What is needed is a more general, cost-effective system for providing high bandwidth transmissions or transmissions with bounded latency and jitter across computer networks.

SUMMARY

The present invention provides a method and an apparatus for facilitating high bandwidth transmissions through a computer network with bounded latency and jitter. The invention operates by sending communications between a source and a destination across a routed network. These communications are used to establish a connection between the source and the destination through a connection-oriented network. In this way, the well-developed addressing structure of a routed network, such as the Internet, can be used to establish a high bandwidth connection through a connection-oriented network.

In one embodiment of present invention, a source node and a destination node are connected together through a plurality of connection-oriented networks, and communications through the routed network are used to select a connection-oriented network based upon parameters such as availability, cost, or to match to the particular speed, delay, or multicast nature of the traffic.

Thus, the present invention can be characterized as a method which operates in a system including, a first node, a second node, a routed network coupled to the first node and the second node, and at least one connection-oriented network coupled to the first node and second node. The method transfers data between the first node and the second node by: sending information between the first node and the second node across the routed network; using the information to establish a connection between the first node and the second node through a connection-oriented network; and a transferring data between the first node and the second node through the connection.

According to one aspect of the present invention, the step of establishing a connection between the first node and the second node includes: using the information sent from the first node to the second node to find at least one feasible connection between the first node and the second node; using the information to further select the best feasible connection based on cost, speed, delay, traffic type, etc; and using the information finally to establish a connection between the first node and the second node.

According to another aspect of the present invention, a connection is maintained by transmitting keep-alive messages from the first node to the second node. The method frees the connection by sending a teardown message from the first node to the second node or by timing out the connection when the keep-alive messages have been absent for a specified period.

According to another aspect of the present invention, the step of sending information between the first node and the second node across the routed network includes sending a request to establish a connection, wherein the request includes connection parameters such as rate and priority. In one embodiment of the present invention, the connection parameters are obtained through a mechanism such as the resource reservation protocol (RSVP) modified to include a service or list of services through which connections may be set up to reach the first node.

According to another aspect of the present invention, step of sending information between the first node and the second node across the routed network includes sending information to enforce security.

According to another embodiment of the present invention, the step of transferring data between the first node and the second node includes multiplexing several data flows between the first node and the second node onto the connection between the first node and the second node through the connection-oriented network.

According to another embodiment of the present invention, the connection-oriented network includes a multicast network, and the step of establishing a connection between the first node and the second node establishes a multicast connection between a plurality of nodes coupled to the multicast network, including the first node and the second node.

According to yet another embodiment of the present invention, the routed network is addressed at layer two or above, and the connection-oriented network is addressed at layer one, virtually or actually.

According to another embodiment of the present invention, the connection-oriented network includes a plurality of connection-oriented networks, and the step of sending information includes exchanging lists of information between the first node and the second node, including information on connection-oriented networks to which the first node and the second node are coupled. The step of using the information to establish a connection selects a connection-oriented network from the plurality of connection-oriented networks by matching the lists of information.

The present invention can also be characterized as a system for transferring data across networks, comprising: a first node; a second node; a routed network coupled to the first node and the second node; at least one connection-oriented network coupled to the first node and the second node; and communication resources within the first node and communication resources within the second node for transferring information between the first node and the second node across the routed network. This information is used to establish a connection between the first node and the second node through a connection-oriented network. The communication resources within the first node and the second node further facilitate the transfer of data between the first node and the second node through the connection after the connection is established.

According to another embodiment of the present invention, the communication resources within the first node contain a switch through which the first node is coupled to and communicates with a connection-oriented network, and the communication resources within the second node contain a switch through which the second node is coupled to and communicates with the connection-oriented network.

According to another embodiment of the present invention, the connection-oriented network includes a plurality of connection-oriented networks. In order to communicate with the plurality of connection-oriented networks, the communication resources within the first node contain a plurality of switches through which the first node is coupled to the plurality of connection-oriented networks. Similarly, the communication resources within the second node contain a plurality of switches through which the second node is coupled to the plurality of connection-oriented networks.

In summary, the present invention provides a method and a apparatus for transferring a high bandwidth stream of data across a computer network with bounded latency and jitter. The invention uses the highly-developed addressing structure of a routed network, such as the Internet, to establish a high bandwidth connection through a connection-oriented network. The invention also provides resources to select a connection-oriented network from a plurality of connection-oriented networks based upon parameters such as cost, availability and traffic requirements.

DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
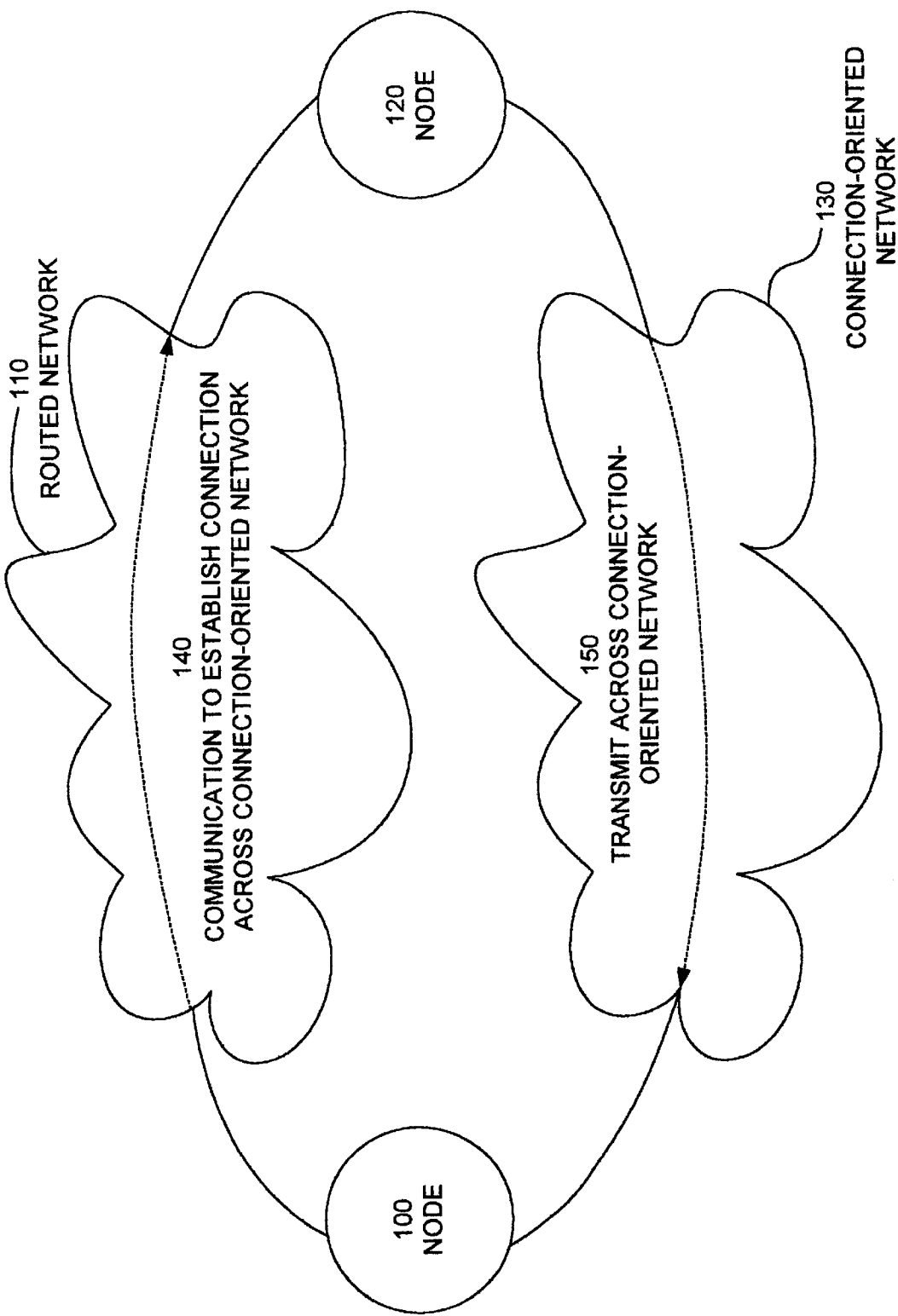
FIG. 1 is a diagram illustrating how communications across a routed network are used to establish a connection through a connection-oriented network in accordance an aspect of the present invention.

FIG. 1. illustrates how communications across a routed network are used to establish a connection through a connection-oriented network in accordance with an aspect of the present invention. Node 100 is coupled to routed network 110 and connection-oriented network 130. Node 120 is similarly coupled to routed network 110 and connection-oriented network 130. The invention operates by first communicating between node 100 and node 120 through routed network 110 to establish a connection across connection-oriented network 130. This is illustrated by dashed line 140 in FIG. 1. After this connection is established, data is transmitted from node 120 to node 100 across connection-oriented network 130. This is illustrated by dashed line 150 in FIG. 1.

Figure 2:
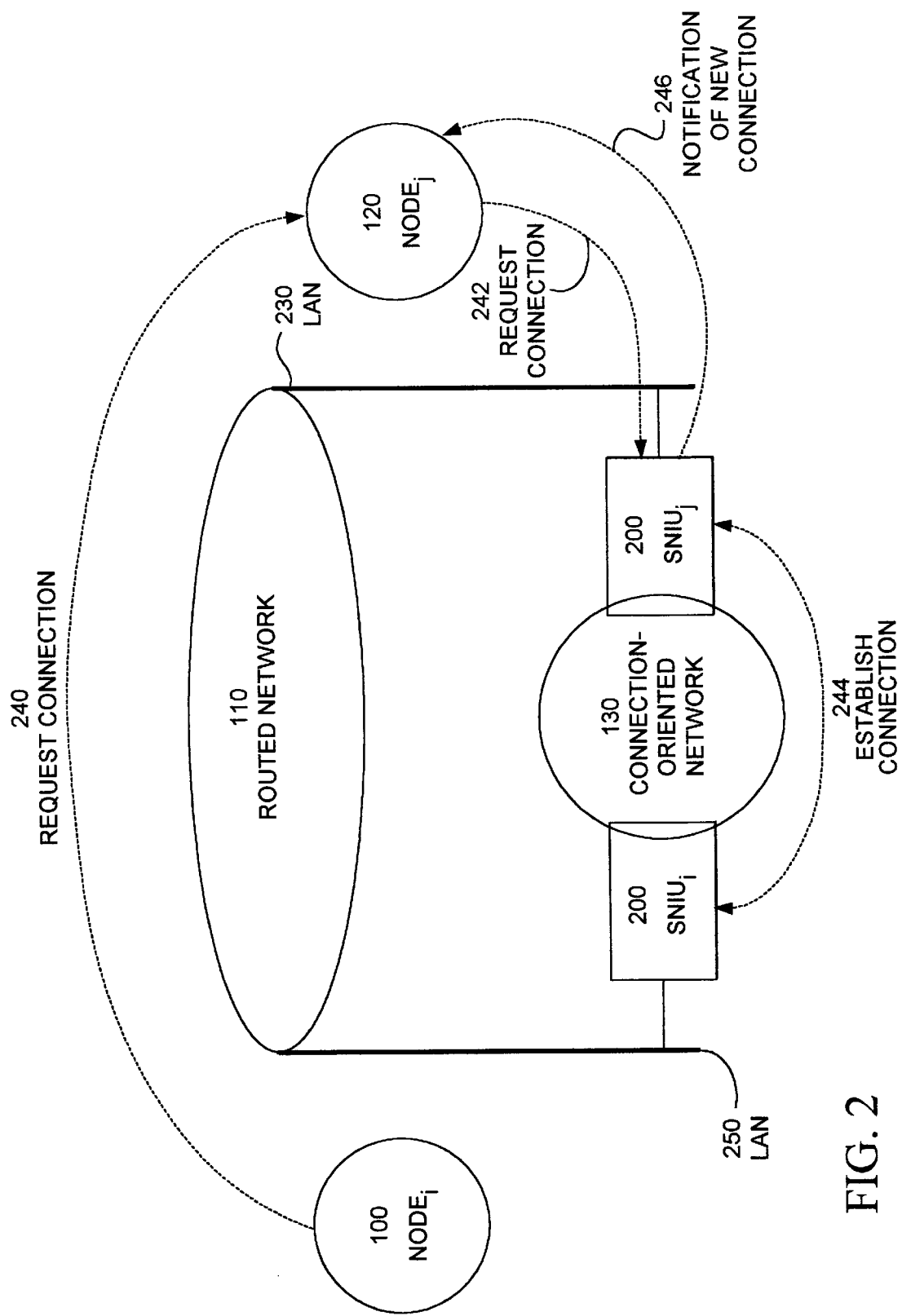
FIG. 2 is a diagram illustrating the steps involved in establishing a connection through the connection-oriented network in accordance with an aspect of the present invention.

FIG. 2 illustrates a sequence of steps involved in establishing a connection through connection-oriented network 130 in accordance within an aspect of the present invention. The system illustrated in FIG. 2 includes $node_j$ 100 and $node_j$ 120. $Node_i$ 100 connects to local area network (LAN) 250, which further connects to routed network 100 and switched network interface $unit_i$ ($SNIU_i$) 200. $Node_i$ 100 communicates with routed network 110 and $SNIU_i$ 200 through LAN 250. $Node_j$ 120 connects to LAN 230, which further connects to routed network 110 and $SNIU_j$ 210. $Node_j$ 120 communicates with routed network 110 and $SNIU_j$ 210 through LAN 230. $SNIU_i$ 200 and $SNIU_j$ 210 both connect to connection-oriented network 130. Communications from $node_i$ 100 and connection-oriented network 130 pass through LAN 250 and $SNIU_i$ 200. Communications between $node_j$ 120 and connection-oriented network 130 pass through LAN 230 and $SNIU_j$ 210.

A connection between $node_i$ 100 and $node_j$ 120 through connection-oriented network 130 is established as follows. First, $node_i$ 100 sends a request for a connection 240 to $node_j$ 120 across routed network 110. Request 240 includes information on how to reach $SNIU_i$ 200 through connection-oriented network 130. $Node_j$ 120 then sends a request for connection 242 through LAN 230 to $SNIU_j$ 210. $SNIU_j$ 210 then exchanges messages with $SNIU_i$ 200 through a connection-oriented network 130, to establish a connection 244 between $SNIU_j$ 210 and $SNIU_i$ 200 through connection-oriented network 130. After the connection is established, $SNIU_j$ 210 sends a notification of new connection 246 to $node_j$ 120. $Node_j$ 120 then begins to send data through connection-oriented network 130 to $node_i$ 100.

Figure 3:
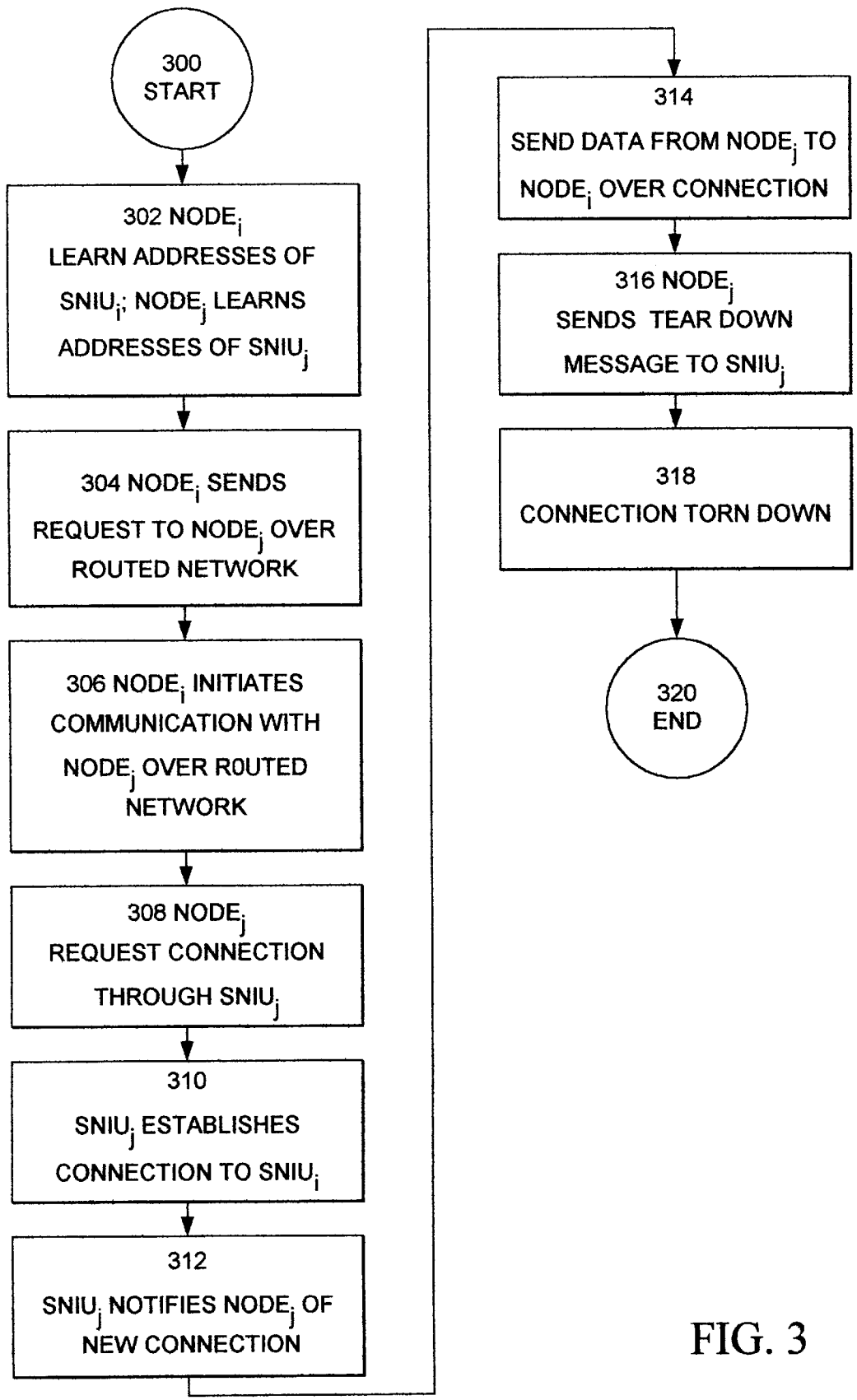
FIG. 3 is a detailed flow chart illustrating the steps involved in using communications through a routed network to establish a connection through a connection-oriented network in accordance with an aspect of the present invention.

FIG. 3 is a flow chart illustrating in more detail the sequence of operations involved in establishing a connection between $node_i$ 100 and $node_j$ 120 across connection-oriented network 130 in FIG. 2. Not shown in FIG. 3 are initialization operations. At system boot-up time, or at some other time, $node_i$ 100 and $node_j$ 120 separately learn that $SNIU_i$ 200 and $SNIU_j$ 210, respectively, exist. They also learn the connection-oriented network addresses and the medium Acess Control (MAC) physical addresses of $SNIU_i$ 200 and $SNIU_j$ 210, respectively.

FIG. 3 illustrates the case where $node_i$ 100 initiates a transfer of data from $node_j$ 120. The flow chart in FIG. 3 starts at state 300 which is a start state. The system next advances to step 302 wherein $node_i$ 100 learns the MAC physical address and the connection-oriented network address of $SNIU_i$ 200, and $node_j$ 120 learns the MAC physical address and the connection-oriented network address of $SNIU_j$ 210. The system then proceeds to step 304.

At step 304, $node_i$ 100 sends a request to $node_j$ 120 over routed network 110. This request is modeled on an RSVP Resv Message (see Resource ReSerVation Protocol (RSVP) Version 1 Functional Specification). The request contains the RSVP Resv data fields and additional fields to inform $node_j$ 120 of the connection-oriented network address of $SNIU_i$ 200 and of the MAC physical address of $node_i$ 100. $Node_j$ 120 the begins to transmit data to $node_i$ 100 over routed network 110. The system then proceeds to step 306.

At step 306, $node_i$ 100 initiates a communication with $node_j$ 120 over routed network 110. The system then proceeds to step 308.

At step 308, $node_j$ 120 requests a connection through $SNIU_j$ 210 by sending a request to $SNIU_j$ 210. This request specifies the connection-oriented network address of $SNIU_i$ 200, the MAC physical address of $node_i$ 100, and identifies the traffic to be sent. In this embodiment, the traffic is identified by specifying the routed network address of the receiving node, $node_i$ 100. In another embodiment, the traffic may be specified by the FILTER_SPEC defined in RSVP. In a multicast environment, the traffic may be specified by either the IP address of the multicast group as used in the IGMP protocol or by the more complete FILTER_SPEC defined in RSVP.

In yet another embodiment, the request from $node_j$ 120 additionally specifies priority, rate and other attributes of the flow from the $node_j$ 120 to $node_i$ 100. These attributes are modeled on the attributes involved in the resource reservation protocol (RSVP), and are used to reserve the capacity and the required level of service across connection-oriented network 130. The system then proceeds to step 310.

At step 310, $SNIU_j$ 210 establishes a connection to $SNIU_i$ 200 using the connection-oriented network address of $SNIU_i$ 200. $SNIU_j$ 210 obtains a virtual circuit number for this connection and verifies the integrity of this connection. $SNIU_j$ 210 makes an entry in a table matching the traffic identifier (in this case the routed network address of $node_i$ 100) to the virtual circuit number through connection-oriented network 130. $SNIU_i$ 200 makes an entry in a table matching the MAC physical address of $node_i$ 100 to the virtual circuit number. This is so $SNIU_i$ 200 can append the MAC address of $node_i$ 100 to the packets received over the virtual circuit. This MAC address must be appended in order to send the packets over LAN 250 to $node_i$ 100. Both $SNIU_i$ 200 and $SNIU_j$ 210 add priority information and other attributes to these tables in response to parameters in request packets. The system then proceeds to step 312.

At step 312, $SNIU_j$ 210 sends a packet over LAN 230 to $node_j$ 120 informing $node_j$ 120 of the new connection. The system then proceeds to step 314.

At step 314, data is sent from $node_j$ 120 to $node_i$ 100 over the virtual circuit. $Node_j$ 120 uses the MAC physical address of $SNIU_j$ 210 instead of the MAC physical address of the router to encapsulate packets destined for $node_i$ 100. Hence, $SNIU_j$ 210 receives these packets instead of the router. Having received the packet, $SNIU_j$ matches the packet with the traffic identifier stored in its table to find the proper virtual circuit to use for transmitting the packet. As a result, packets from $node_j$ 120 flow to $node_i$ 100 over a path through $SNIU_j$ 210 and connection-oriented network 130 with priority and flow rates enforced by the connection-oriented network 130. $SNIU_i$ 200 receives the packets on the virtual circuit and uses the MAC physical address associated with that virtual circuit number to encapsulate the packet for transmission on the LAN 250. In another embodiment, the $SNIU_i$ 200 makes an entry associating the MAC physical address of the next hop LAN router with the traffic received on said virtual circuit. In such an embodiment, the traffic will flow to $node_i$ 100 through a LAN router rather than directly over the LAN as in this embodiment. To maintain the connection through connection-oriented network 130, node$_j$ 120 periodically sends "keep alive" packets modeled on RSVP across connection-oriented network 130 to keep the connection active. The means through which node$_j$ 120 uses the MAC physical address of SNIU$_j$ 210 instead of the MAC physical address of the router to encapsulate packets destined for node$_i$ 100 is as follows. It is common in Internet Protocol (IP) networking for a node to employ an Address Resolution Protocol (ARP) cache to map IP subnets to MAC physical addresses. This table defines the routers to be used to forward IP packets to specific IP subnets by specifying the MAC physical address of those routers. In one embodiment, a software function is implemented in node$_j$ 120 that adds the routed network address of node$_i$ 100 to the ARP cache and specifies the MAC physical address of SNIU$_j$ 210 as the physical destination for this IP value. This function is invoked when a message is received from SNIU$_j$ 210 affirming that the connection is set-up. A tear-down message or a time-out resets the entry to point to the default router. The system then proceeds to step 316.

At step 316, data transmission is complete and node$_j$ 120 sends a tear down message to SNIU$_j$ 210. The system then proceeds to step 318.

At step 318, the connection through connection-oriented network 130 is torn down. The system then proceeds to step 320 which is an end state. Alternatively, if node$_j$ 120 does not send a tear down message to SNIU$_j$ 210 the virtual circuit will eventually be torn down when a time out period elapses without communications across the virtual circuit.

Figure 4:
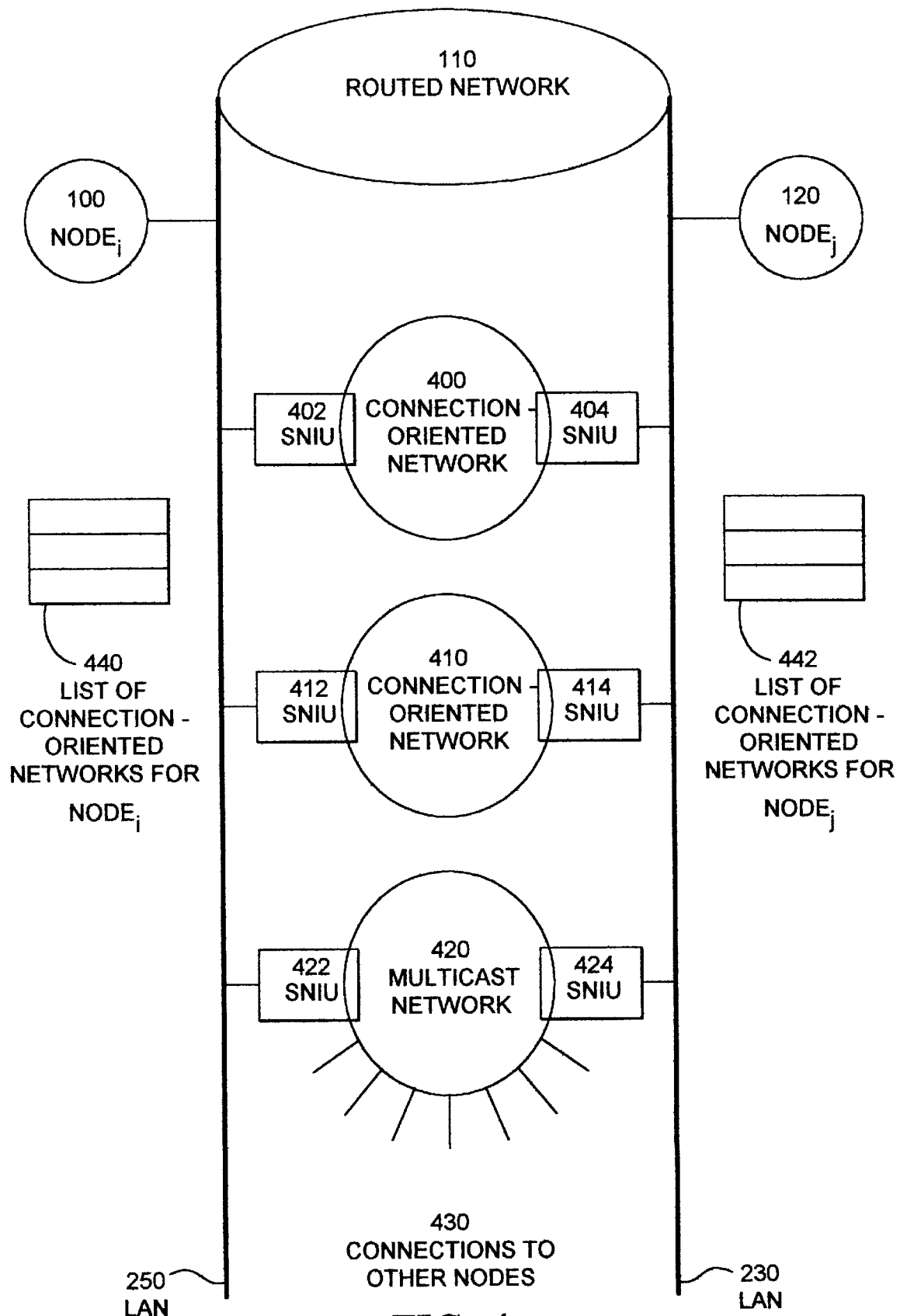
FIG. 4 is a diagram illustrating an embodiment of a present invention wherein a network can be selected from a plurality of connection-oriented and multicast networks based upon parameters such as availability and cost in accordance with an aspect of their present invention.

FIG. 4 illustrates a plurality of connection-oriented networks and a multicast network for transmitting data between node$_i$ 100 and node$_j$ 120 in accordance with an aspect of the present invention. Node$_i$ 100 connects to LAN 250, which further connects to routed network 110, SNIU 402, SNIU 412 and SNIU 422. Node$_i$ 100 communicates with routed network 110, SNIU 402, SNIU 412 and SNIU 422 through LAN 250. Node$_j$ 120 connects to LAN 230, which further connects to routed network 110, SNIU 404, SNIU 414 and SNIU 424. Node$_j$ 120 communicates with routed network 110, SNIU 404, SNIU 414 and SNIU 424 through LAN 230. SNIU 402 and SNIU 404 connect to connection-oriented network 400, through which SNIU 402 and SNIU 404 communicate with each other. SNIU 412 and SNIU 414 connect to connection-oriented network 410, through which SNIU 412 and SNIU 414 communicate with each other. Multicast network 420 connects to SNIU 422, SNIU 424 and connections to other nodes 430. Multicast network 420 facilitates multicast connections between SNIU 422, SNIU 424 and connections to other nodes 430.

In order to establish a connection, a connection-oriented network or a multicast network must first be selected. Node$_i$ 100 maintains a list 440 of connection-oriented networks for node$_i$ 100. Node$_j$ 120 maintains to a list 442 of connection-oriented networks for node$_j$ 120. List 440 and list 442 contain information about respective connection-oriented networks 400 and 410, as well as multicast network 420. This information includes information on availability, cost, flow parameters, and existing circuits. Lists 440 and 442 are compared to determine an optimal connection-oriented network or multicast network for transmissions between node$_i$ 100 and node$_j$ 120.

The present invention additionally includes other significant aspects. Data transmissions have so far been described as passing from node$_j$ 120 to node$_i$ 100. However, resources are additionally provided for transmissions from node$_i$ 100 to node$_j$ 120. In one embodiment of the present invention, information is sent between nodes or SNIUs to enforce security and for other purposes. Another embodiment of the present invention builds connections through mixed networks, including connection-oriented segments and routed segments. Finally, another embodiment of the present invention multiplexes a plurality of flows onto a single virtual circuit through a connection-oriented network.

CONCLUSION

The present invention provides a system and method for facilitating high bandwidth communications through a data network with bounded latency and jitter. The invention operates by using communications through a routed network, such as the Internet, to establish a communication pathway through a connection-oriented network, such as an ATM or a frame relay network. The present invention also facilitates connections through a plurality of connection-oriented networks by allowing nodes to select a connection-oriented network based upon parameters such as availability and cost. Finally, the present invention facilitates connections through multicast and mixed routed/connection-oriented networks.

The foregoing description of embodiments of the present invention have been presented for purposes of illustration and description only. There are not intended to be exhaustive or to limit the invention to the forms disclosed. Many modifications and variations will be apparent to practitioners skilled in the art.

What is claimed is:

1. A method for transferring data between a first node and a second node, the method operating in a system including, the first node, the second node, a routed network coupled to the first node and the second node, and a connection-oriented network coupled to the first node and the second node, the method comprising:

sending information between the first node and the second node across the routed network, and the information including a medium access control address of the first node;

using the information to establish a connection between the first node and the second node through the connection-oriented network; and transferring data between the first node and the second node through the connection.

2. The method of claim 1, wherein the step of sending information between the first node and the second node across the routed network includes sending a request to establish a connection from the first node to the second node.

3. The method of claim 1, wherein the step of sending information between the first node and the second node across the routed network includes sending a request to establish a connection from the first node to the second node, wherein the request includes connection parameters, including data transfer rate and priority of the connection relative to other connections.

4. The method of claim 1, wherein the system includes resources to execute a resource reservation protocol (RSVP), and the step of sending information between the first node and the second node across the routed network includes sending a request to establish a connection from the first node to the second node, wherein the request includes connection parameters obtained through the resource reservation protocol.

5. The method of claim 1, wherein the step of sending information between the first node and the second node across the routed network includes sending to the second node routing information on how to reach the first node through the connection-oriented network.

6. The method of claim 1, wherein the step of sending information between the first node and the second node across the routed network includes sending the routed network address of the first node to the second node.

7. The method of claim 1, wherein the step of sending information between the first node and the second node across the routed network includes exchanging connection-oriented network addresses between the first node and the second node.

8. The method of claim 1, wherein the step of sending information between the first node and the second node across the routed network includes sending information used to enforce security.

9. The method of claim 1, wherein the step of transferring data between the first node and the second node transfers data from the second node to the first node.

10. The method of claim 1, wherein the step of transferring data between the first node and the second node transfers data from the first node to the second node and the second node to the first node.

11. The method of claim 1, wherein the step of transferring data between the first node and the second node multiplexes several flows of data between the first node and the second node onto the connection.

12. The method of claim 1, wherein the step of transferring the data through the connection includes translating a routed network address to a connection-oriented network address.

13. The method of claim 1, wherein the connection-oriented network includes a multicast network, and the step of establishing a connection between the first node and the second node establishes a multicast connection between a plurality of nodes including the first node and the second node.

14. The method of claim 1, wherein the routed network is addressed at layer two or above, and the connection-oriented network is addressed at layer one virtually or actually.

15. The method of claim 1, wherein the connection-oriented network includes a plurality of connection-oriented networks, and the step of sending information sends information about connection-oriented networks in the plurality of connection-oriented networks to which the first node is coupled.

16. The method of claim 1, wherein:
the connection-oriented network includes a plurality of connection-oriented networks and the step of sending information sends information about the plurality of connection-oriented networks, the information including cost and capacity of connection-oriented networks in the plurality of connection-oriented networks; and
including the step of selecting a connection-oriented network from the plurality of connection-oriented networks based upon the information.

17. The method of claim 1, wherein the connection is maintained by transmitting keep-alive messages through the connection.

18. The method of claim 1, wherein the physical address is a media access control address.

19. The method of claim 1, further comprising transferring data sent by the second node and received at the first node to the physical address of the first node.

20. A method for transferring data between a first node and a second node, the method operating in a system including, the first node, the second node, a routed network coupled to the first node and the second node, and a connection-oriented network coupled to the first node and the second node, and the connection-oriented network includes a plurality of connection-oriented networks, the method comprising:
sending information between the first node and the second node across the routed network, including exchanging lists of information between the first node and the second node, and the information at least about connection-oriented networks in the plurality of connection-oriented networks to which the first node and the second node are coupled;
using the information to establish a connection between the first node and the second node through the connection-oriented network, including selecting a connection-oriented network from the plurality of connection-oriented networks by matching the lists; and
transferring data between the first node and the second node through the connection.

21. A method for transferring data between a first node and a second node, the method operating in a system including, the first node, the second node, a routed network coupled to the first node and the second node, and a connection-oriented network coupled to the first node and the second node, the method comprising:
sending a request to establish a connection from the first node to the second node including,
connection parameters,
a routed network address of the first node,
a connection-oriented network address of the first node, and
a Medium Access Control address of the first node;
using the information to establish a connection between the first node and the second node through the connection-oriented network; and
transferring data from the second node to the first node through the connection, including translating a routed network address to a connection-oriented address.

22. The method of claim 21, wherein in the step of sending a request, the request includes connection parameters obtained through a resource reservation protocol (RSVP).

23. The method of claim 21, wherein the step of sending a request to establish a connection from the first node to the second node includes sending information used to enforce security.

24. The method of claim 21, wherein the step of transferring data from the second node to the first node multiplexes several flows of data between the second node and the first node onto the connection.

25. The method of claim 21, wherein the routed network includes a multicast network, and the step of establishing a connection between the first node and the second node establishes a multicast connection between a plurality of nodes including the first node and the second node.

26. The method of claim 21, wherein the routed network is addressed at layer two or above, and the connection-oriented network is addressed at layer one virtually or actually.

27. The method of claim 21, wherein the connection-oriented network includes a plurality of connection-oriented networks, and the step of sending a request to establish a connection sends information about the plurality of connection-oriented networks to which the first node is coupled.

28. The method of claim 21, wherein:

the connection-oriented network includes a plurality of connection-oriented networks and the step of sending information sends information about the plurality of connection-oriented networks, the information including cost and capacity of connection-oriented networks in the plurality of connection-oriented networks; and including the step of selecting a connection-oriented network from the plurality of connection-oriented networks based upon the information.

29. The method of claim 21, wherein the connection is maintained by transmitting keep-alive messages through the connection.

30. The method of claim 21, wherein the physical address is a media access control address.

31. The method of claim 21, further comprising transferring the data within the first node to the physical address of the first node.

32. A method for transferring data between a first node and a second node, the method operating in a system including, the first node, the second node, a routed network coupled to the first node and the second node, and a connection-oriented network coupled to the first node and the second node, and the connection-oriented network includes a plurality of connection-oriented networks, the method comprising:

sending a request to establish a connection from the first node to the second node, further including exchanging lists of information between the first node and the second node, and the information including information about connection-oriented networks in the plurality of connection-oriented networks to which the first node and the second node are coupled, and the request including a) connection parameters, b) a routed network address of the first node, and c) a connection-oriented network address of the first node;

using the information to establish a connection between the first node and the second node through the connection-oriented network, including selecting a connection-oriented network from the plurality of connection-oriented networks by matching the lists; and transferring data from the second node to the first node through the connection, including translating a routed network address to a connection-oriented address.

33. A system for transferring data across networks, comprising:

a first node;

a second node;

a routed network coupled to the first node and the second node;

a connection-oriented network coupled to the first node and the second node; and communication resources within the first node and communication resources within the second node for, transferring information including a Medium Access Control address of the first node between the first node and the second node across the routed network, using the information to establish a connection between the first node and the second node through the connection-oriented network, and transferring data between the first node and the second node through the connection.

34. The system of claim 33, wherein the communication resources within the first node and the communication resources within the second node include resources that send a request across the routed network to establish a connection from the first node to the second node.

35. The system of claim 33, wherein the communication resources within the first node and the communication resources within the second node include resources that send a request to establish a connection from the first node to the second node across the routed network, wherein the request includes connection parameters obtained through a resource reservation protocol (RSVP).

36. The system of claim 33, wherein the communication resources within the first node and the communication resources within the second node include resources that send across the routed network to the second node routing information on how to reach the first node through the connection-oriented network.

37. The system of claim 33, wherein the communication resources within the first node and the communication resources within the second node include resources that send the routed network address of the first node to the second node across the routed network.

38. The system of claim 33, wherein the communication resources within the first node and the communication resources within the second node include resources that exchange connection-oriented network addresses between the first node and the second node across the routed network.

39. The system of claim 33, wherein the communication resources within the first node and the communication resources within the second node include resources that send information used to enforce security across the routed network between the first node and the second node.

40. The system of claim 33, wherein the communication resources within the first node and the communication resources within the second node include resources that transfer data from the second node to the first node through the connection.

41. The system of claim 33, wherein the communication resources within the first node and the communication resources within the second node include resources that transfer data from the first node to the second node and the second node to the first node.

42. The system of claim 33, wherein the communication resources within the first node and the communication resources within the second node include resources that multiplex several flows of data between the first node and the second node onto the connection through the connection-oriented network.

43. The system of claim 33, wherein the routed network includes the Internet.

44. The system of claim 33, wherein the routed network includes a multicast network, and the communication resources within the first node and the communication resources within the second node include resources that establish a multicast connection between a plurality of nodes including the first node and the second node.

45. The system of claim 33, wherein the routed network is addressed at layer two or above, and the connection-oriented network is addressed at layer one virtually or actually.

46. The system of claim 33, wherein the connection-oriented network includes a plurality of connection-oriented networks, and the communication resources within the first node and the communication resources within the second node include resources that send to the second node information about connection-oriented networks in the plurality of connection-oriented networks to which the first node is coupled.

47. The system of claim 33, wherein the connection-oriented network includes a plurality of connection-oriented networks, and the communication resources within the first node and the communication resources within the second node include resources that exchange information between the first node and the second node about the plurality of connection-oriented networks, the information including cost and capacity parameters of connection-oriented networks in the plurality of connection-oriented networks.

48. The system of claim 33, including resources that send keep alive messages through the connection to keep the connection alive.

49. The system of claim 33, wherein:
the communication resources within the first node contain a switch through which the first node is coupled to the connection-oriented network; and
the communication resources within the second node contain a switch through which the second node is coupled to the connection-oriented network.

50. The system of claim 33, wherein:
the connection-oriented network includes a plurality of connection-oriented networks;
the communication resources within the first node contain a plurality of switches through which the first node is coupled to the plurality of connection-oriented networks; and
the communication resources within the second node contain a plurality of switches through which the second node is coupled to the plurality of connection-oriented networks.

51. The method of claim 33, wherein the physical address is a media access control address.

52. The method of claim 33, wherein the communication resources transfer the data within the first node to the physical address of the first node.

53. The method of claim 33, further comprising transferring data sent by the second node and received at the first node to the physical address of the first node.

54. A system for transferring data across networks, comprising:
a first node;
a second node;
a routed network coupled to the first node and the second node;
a connection-oriented network coupled to the first node and the second node, and the connection-oriented network includes a plurality of connection-oriented networks; and
communication resources within the first node and communication resources within the second node for, transferring information between the first node and the second node across the routed network, using the information to establish a connection between the first node and the second node through the connection-oriented network, and transferring data between the first node and the second node through the connection, and the communication resources within the first node and the communication resources within the second node include resources that a) exchange lists of information between the first node and the second node, including information about connection-oriented networks in the plurality of connection-oriented networks to which the first node and the second node are coupled, and b) select a connection-oriented network from the plurality of connection-oriented networks by matching the lists.

55. In a system including a first node coupled to a routed network and a connection-oriented network, a method for transferring data from the first node to a second node, comprising:
receiving at the first node through the routed network a request for a connection from the second node, and the request including a Medium Access Control address of the second node;
in response to the request, establishing from the first node a connection to the second node through the connection-oriented network; and
transferring data from the first node to the second node through the connection.

56. The method of claim 55, wherein the request received from the second node includes connection parameters, including data transfer rate and priority of the connection relative to other connections.

57. The method of claim 55, wherein the request received from the second node includes connection parameters obtained through a resource reservation protocol (RSVP).

58. The method of claim 55, wherein the request received from the second node includes routing information on how to reach the second node through the connection-oriented network.

59. The method of claim 55, wherein the request received from the second node includes the routed network address of the second node.

60. The method of claim 55, wherein the request received from the second node includes information used to enforce security.

61. The method of claim 55, including the step of transferring data from the second node to the first node.

62. The method of claim 55, wherein the step of transferring data multiplexes several flows of data between the first node and the second node onto the connection.

63. The method of claim 55, wherein the step of transferring data includes translating a routed network address to a connection-oriented network address.

64. The method of claim 55, wherein the connection-oriented network includes a multicast network, and the step of establishing a connection between the first node and the second node establishes a multicast connection between a plurality of nodes including the first node and the second node.

65. The method of claim 55, wherein the routed network is addressed at layer two or above, and the connection-oriented network is addressed at layer one virtually or actually.

66. The method of claim 55, wherein the connection-oriented network includes a plurality of connection-oriented networks, and the request received from the second node includes information about connection-oriented networks in the plurality of connection-oriented networks to which the second node is coupled.

67. The method of claim 55, wherein the connection-oriented network includes a plurality of connection-oriented networks, and the request received from the second node includes information about the plurality of connection-oriented networks to which the second node is coupled, the information including cost and capacity of connection-oriented networks in the plurality of connection-oriented networks.

68. The method of claim 55, wherein the connection is maintained by transmitting keep-alive messages through the connection.

69. The method of claim 55, wherein the physical address is a media access control address.

70. In a system including a first node coupled to a routed network and a connection-oriented network the connection-oriented network includes a plurality of connection-oriented networks, a method for transferring data from the first node to a second node, comprising:

receiving at the first node through the routed network a request for a connection from the second node;

in response to the request, establishing from the first node a connection to the second node through the connection-oriented network, including selecting a connection-oriented network from the plurality of connection-oriented networks by matching the lists;

exchanging lists of information between the first node and the second node, including information about connection-oriented networks in the plurality of connection-oriented networks to which the first node and the second node are coupled; and transferring data from the first node to the second node through the connection.

* * * * *